Aug. 4, 1964 G. F. AROYAN ET AL 3,143,654

RADIANT ENERGY DETECTING DEVICE USING DISC-SHAPED RETICLE

Filed Aug. 25, 1958 5 Sheets-Sheet 1

GEORGE F. AROYAN
HOWARD E. WILLIAMS
INVENTORS

BY Morris Spector
ATTORNEY

RADIANT ENERGY DETECTING DEVICE USING DISC-SHAPED RETICLE

Filed Aug. 25, 1958 5 Sheets-Sheet 2

GEORGE F. AROYAN
HOWARD E. WILLIAMS
INVENTORS

BY Morris Spector
ATTORNEY

Aug. 4, 1964 G. F. AROYAN ETAL 3,143,654

RADIANT ENERGY DETECTING DEVICE USING DISC-SHAPED RETICLE

Filed Aug. 25, 1958 5 Sheets-Sheet 3

GEORGE F. AROYAN
HOWARD E. WILLIAMS
INVENTORS

BY [signature]
ATTORNEY

GEORGE F. AROYAN
HOWARD E. WILLIAMS
INVENTORS

BY
Morris Spector
ATTORNEY

GEORGE F. AROYAN
HOWARD E. WILLIAMS
INVENTORS

BY

ATTORNEY

United States Patent Office 3,143,654
Patented Aug. 4, 1964

3,143,654

RADIANT ENERGY DETECTING DEVICE USING DISC SHAPED RETICLE

George F. Aroyan, Manhattan Beach, and Howard E. Williams, Torrance, Calif., assignors, by mesne assignments, to The Bunker-Ramo Corporation, Canoga Park, Calif., a corporation of Maryland Filed Aug. 25, 1958, Ser. No. 757,650
11 Claims. (Cl. 250—233)

This invention relates to improved forms of reticles suited for use in optical systems for determining the existence of and/or position of a radiant energy source or reflector, and more particularly to an improved form of optical reticle sometimes referred to as a chopping reticle comprised of areas of relative opacity and transparency to radiant energy to modulate the intensity of energy received by an optical system by movement of the reticle at an energy interrupting position between the radiant energy source and a photoelectric or other cell sensitive to the energy.

In the prior art, numerous systems including chopping reticles have been disclosed for detecting and determining the position of bodies from which is emanated some form of detectable energy such as light, heat, or radio frequency waves. A number of these prior art systems have provided considerable sensitivity and accuracy in their operation. However, especially in the field of visible or infrared target detection, there exists considerable need for improving the sensitivity and response speed of such systems so as to afford more suitable apparatus, by way of example, for detecting or tracking moving bodies or targets such as modern supersonic aircraft and missiles.

As will appear hereinafter, although the chopping reticle of the present invention finds particularly useful application to detection systems responsive to infrared radiation, the novel features thereof are also of advantage in radiant energy detection systems based upon the detection of radio waves and visible and invisible light rays. To this end the term "optical," often employed as descriptive of visible light processing systems, will, as used in this specification, be construed as being also descriptive of systems for collecting, directing, refracting, transducing and detecting radiant energy other than that constituting visible light.

In most prior art optical systems incorporating a chopping reticle and employed for detecting and determining the position of a target, the space in which it is suspected that an energy emanating target may be present is systematically examined by an optical type energy collection apparatus. The energy collection apparatus, generally employing combinations of mirrors and lenses, is designed to be responsive on a selective basis to only that energy which is collected within a given angular field of view so that the collection apparatus may be regarded as having a responsive pattern generally representable as a solid cone extending into space with the apex of the cone positioned at a given point of observation. This angular field of view, or response pattern, is generally referred to as the "instantaneous field of view" or sometimes "field of view" of the collection apparatus and is defined by the size of the "field stop" characterizing the collection apparatus itself. The "field stop" size of such collection apparatus is generally determined either by a diaphragm restriction in the optical path within the apparatus or by inherent characteristics of the lenses or mirrors used. The optical axis of the collection apparatus, as projected into space, is in most cases centrally disposed within this instantaneous field of view so that the optical axis of the energy collection system is in geometric coincidence with the axis of the conical response pattern of the apparatus.

The energy collected within the instantaneous field of view is directed to an energy sensitive cell which develops an electrical potential or signal, the magnitude of which represents the intensity of the total radiant energy collected within the field of view which includes energy emanating from the target per se as well as background radiation such as sky, clouds, water, etc., against which the target may appear.

However, in accordance with the prior art technique, it is common to find that a circular disc-like chopping reticle is positioned within the energy collection apparatus at an image or focal plane thereof. Such a reticle is rotated about its axis in interrupting relation to radiation collected by the apparatus to "chop" the radiation as it is directed to the sensitive cell. This type of reticle is generally called a chopping reticle because it comprises a pattern of carefully dimensioned alternate areas of relative opacity and transmissivity to energy collected by the apparatus to intercept radiation. These areas often have the shape of sectors of a circle. The areas of transmissivity, defined by alternate areas of relative opacity on the reticle, are sometimes called "recticle apertures." It has been the practice to align the rotational axis of the reticle with the optical axis of the collection apparatus as at an image plane thereof so as to focus or image the field of view on the reticle. The field of view, as imaged on the reticle, is generally circular in shape and is defined in size by the aforementioned field stop of the apparatus. The diameter of the reticle has in the past been made just large enough to embrace the entire imaged field of view to thus interfere with all energy reaching the cell.

In prior art systems incorporating such chopping reticles, the reticle is rotated about its axis at a selected angular velocity. As it rotates, the reticle apertures move across the imaged field of view and modulate the total energy passing therethrough to the energy sensitive cell. The cell then produces an output signal having a direct-current component proportional to the average illumination thereof and generally a plurality of alternating-current harmonically related modulation components, the largest and fundamental alternating-current component having a frequency equal to the chopping frequency of the reticle. The magnitude of the modulation of the energy radiated from targets or images in the imaged field of view by a chopping reticle and hence the magnitude of the corresponding fundamental alternating-current signal produced by the cell will be a maximum only for targets having the same order of dimensions as the reticle apertures themselves in the direction of movement thereof. This is true because only a relatively small portion of the energy radiating from larger or smaller targets will be modulated continuously by the reticle chopping action whereas the total energy received from a target having a linear dimension equal to that of a reticle aperture will be modulated. Due to the fact that energy radiating from targets of a predetermined size is modulated to a greater extent than energy from larger or smaller ones, a chopping reticle thus effectively discriminates against targets of the larger and smaller sizes in favor of those of the predetermined size. In other words, it exhibits a certain size selectivity as an electrical filter exhibits a certain time-frequency selectivity. Analogously then, the target size discriminating effect of a chopping reticle is called "space filtering" because the maximum contribution of targets to the fundamental alternating-current component of the cell output signal is limited by a chopping reticle to targets of a certain size. In practice it is desirable to make the width of the reticle aperture substantially equal to the blur circle of the optical system. The "blur" circle is the minimum size to which any size target can be focused on the reticle due to inherent aberrations in the mirror and lens elements of the optical system.

In practice, the detection of and determination of the position of a given target with apparatus including a chopping reticle is accomplished in two steps, usually termed "search" and "track." First, in search the collection apparatus is mechanically driven to execute a systematic scanning action which results in the exploratory examination of a volume of space which is many times greater than the instantaneous field of view subtended by the collection apparatus and in which it is expected that an energy radiating target may be present. The output of the energy sensitive cell is oftentimes recorded or stored, on a memory basis, as the search action proceeds, so that after completion of the search cycle the apparatus may be automatically returned to one or more selected positions corresponding to the orientations of the apparatus at those specific instances within the period of the searching cycle at which target energy has been detected. After redirection of the apparatus so that its field of view embraces that general volume in space in which a specific target has been detected, the second or "track" step of the position determining process is initiated, namely, that of determining the angular position of the target with respect to the optical axis of the energy collection apparatus during which time the optical axis is often moved or "nutated" around a circular path in space which embraces the target.

During nutation, the optical axis of the energy collection system, as projected into space, is moved around a closed loop or path defined on a spherical surface in space. This path is so positioned and restricted in size as to afford pick-up of energy from the target during the movement of the instantaneous field of view. When such is the case, a frequency modulation will be imposed on the output signal of the radiant energy sensitive cell. By comparing the phase of the frequency modulation of the cell output signal with a signal having a phase representing the position of the optical axis as it is nutated, the polar angle coordinate of a target in the imaged field of view may be ascertained. Similiarly, the magnitude of the frequency modulating signal will be proportional to the polar radius coordinate of the target in the imaged field of view. From this information, a servo control system may be brought into action to track or follow any target motion.

Some chopping reticles made in accordance with the invention are suitable for use during both searching and tracking operations although some must be used only during search.

Although both searching and tracking may be performed with the reticle axis coinciding with the optical axis of the collection apparatus, in accordance with a rather recent development in this art, the reticle may be offset and have its axis spaced from the system optical axis. There are substantial adavntages which may be derived from the use of the offset reticle. Thus, although reticles made in accordance with the invention may be employed in the centered position, they also may be employed in the offset position to enhance certain basic advantages of that system. However, reticles made in accordance with the invention have substantial advantages over prior art reticles which advantages are independent of the position in which the reticles of the invention are used.

For example, a conventional spoked reticle is far from an ideal space filter because the distance between relatively opaque areas defining the reticle apertures varies with the radial distance from the reticle center. Although some space filtering is performed by spoked recticles, undesired signals, generally called noise, are produced by the sensitive cell at the fundamental chopping frequency of such a reticle. Maximum contribution to this noise is made by noise sources presenting images in the imaged field of view equal in size to reticle aperture spacing at the particular radial distance from the reticle center that they exist. The effect of plural noise sources is then cumulative and all radiant energy sources such as clouds, sun, terrrain, etc., which comprise "background" radiation against which a target may appear, are potential noise sources.

The problem of distinguishing a target signal from noise produced by the presence of undesired sources is an unusually difficult one. Due to the fact that such noise appears as signal energy at the fundamental chopping frequency of the reticle, an electrical filter simply cannot be used to discriminate against this type of noise.

Although a disc-shaped spoked reticle does not have optimum space filtering characteristics and discrimination against this type of noise, when such reticle is used in an offset position better discrimination may be achieved than when it is used in the centered position. For example, by making the reticle very large in comparison to a given sized imaged field of view and maintaining a given mean spoke spacing, and by positioning the reticle to intercept the imaged field of view very near to its outer edge, relatively opaque and transparent spoke-shaped areas having very small departures from their mean widths may be passed through the imaged field of view whereby modulation of radiant energy emanating from targets larger or smaller than the blur circle may be minimized. However, this procedure has a practical limit due to the fact that the reticle cannot be made infinitely large. Further, size may often be a strict limitation as to the construction of a reticle.

The present invention overcomes these and other disadvantages of the prior art by providing a reticle having alternate adjacent areas thereon relative opaque and transparent to radiant energy, all of the areas having equal widths throughout lengths and extending radially and circumferentially from an area of inception at the reticle center. Lines dividing the relatively opaque areas from the relatively transparent areas will then be approximately the shape of involutes, an involute by definition being a curve traced by any point of a perfectly flexible inextensible thread kept taut as it is wound upon or unwound from another curve. Thus, by making the widths of all transparent areas substantially equal to the blur circle diameter, optimum target size discrimination, i.e., space filtering, may be performed over the entire area of a reticle made in accordance with the invention with the exception of its center. The center of an offset reticle need not appear in the imaged field of view. Thus, this presents no problem in the case of the offset reticle. Still further, it does not increase the problem in a centered reticle because a conventional spoked reticle has exactly the same disadvantage.

The involute type pattern reticle made in accordance with the invention may be modified in several ways, for example, to accomplish conventional amplitude modulation or frequency modulation of stationary point targets for position determinations as do reticles of the prior art.

Still further, the involute pattern of the reticle of the invention may also be modified to prevent "background line" modulation from being exactly the same as a point target modulation. Such a "background line" is typified by a horizon line within a given field of view or by vertically or horizontally extending lines defining cloud structure in the sky.

In accordance with the invention, but for search operation only, V-shaped or zig-zag opaque and transparent areas may be employed on a reticle with an involute-type pattern to interrupt long background lines so that they will not produce the same type of intensity modulation as point targets. It is an important feature of the invention that both the involute-type and V-shaped or zig-zag patterns may be employed on the same reticle to derive the advantages of both, i.e., of space filtering and background line discrimination. This is accomplished by abruptly reversing the direction of curvature of the involute-type pattern at least at one radius on a reticle. Due to the very shape of the involute-type pattern, this arrangement becomes unusually easy to construct.

Other advantages of the invention may be better understood when considered in connection with the following description.

In the accompanying drawings which are to be considered merely illustrative:

Figure 5:
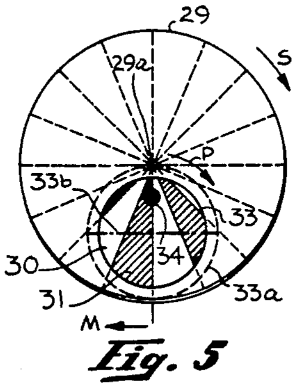
FIG. 5 is a front elevational view of a reticle having an area thereon indicating the position of an imaged field of view when the reticle axis is offset from the optical axis of the collection apparatus with which it is used.
Figure 6A:
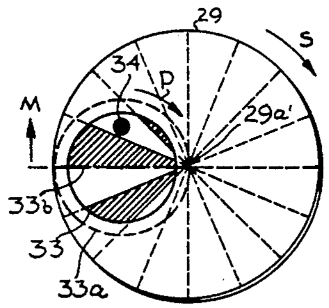
Figure 6B:
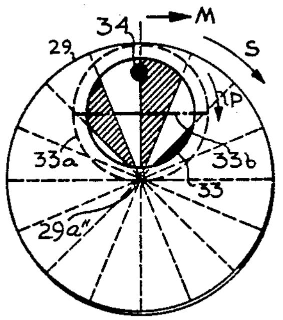
Figure 6C:
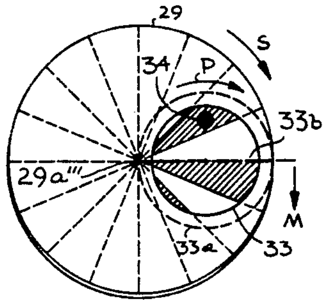
Figure 11:
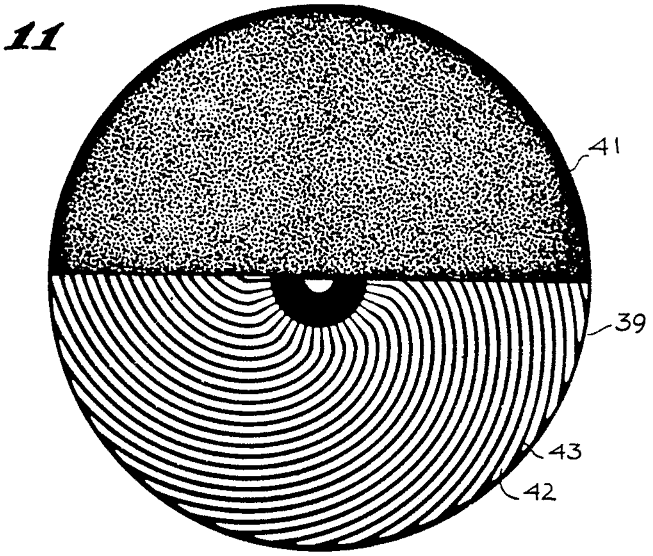
Figure 12:
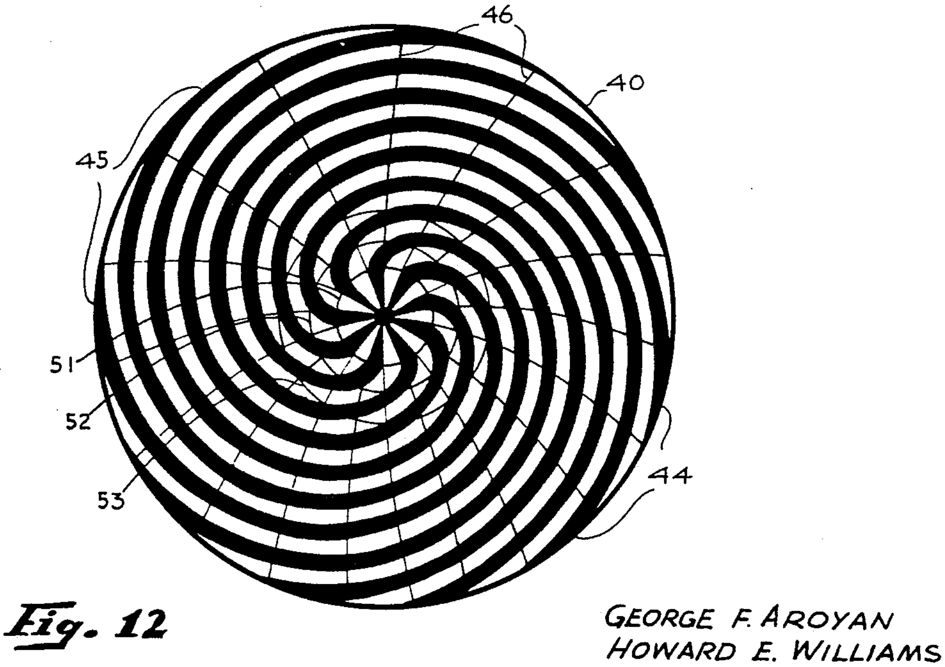
Figure 13:
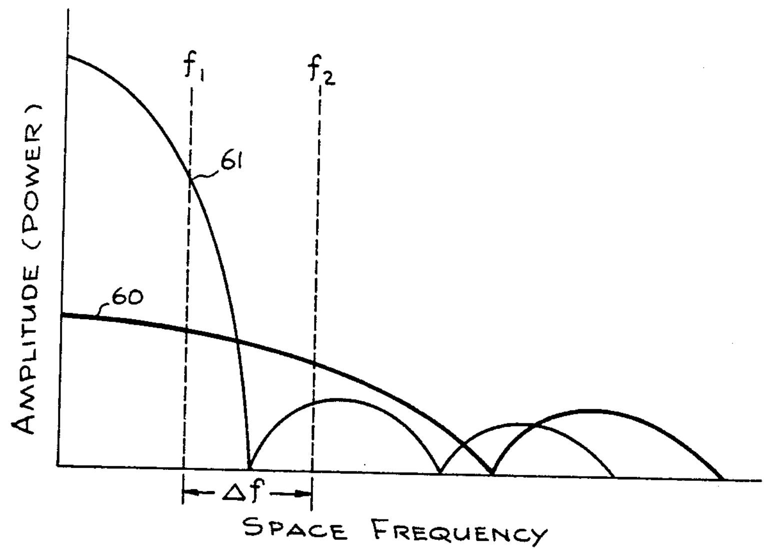

FIGS. 6*a*, 6*b* and 6*c* are front elevational views of the reticle arrangement of FIG. 5 but illustrating different positions of an offset imaged field of view thereon when the axis of the reticle is moved around the imaged field of view thereon, or vice versa, for determining the angular position of a point target in the imaged field of view;

FIGS. 7–12 are front elevational views of reticles incorporating six different embodiments of the invention including an involute pattern of areas opaque and transparent to radiant energy; and FIG. 13 is a graph of two functions illustrating target size selectivity which may exist with a conventional spoked reticle.

Figure 1:
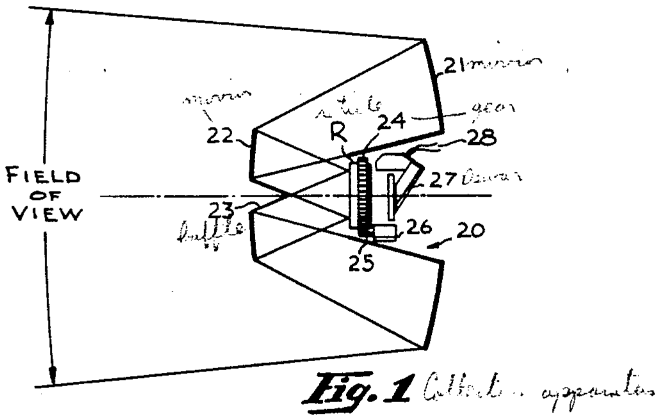
FIG. 1 is a schematic diagram of an optical system in which the reticle of the invention may be employed.

In the drawings in FIG. 1, radiant energy collection apparatus is indicated at 20 having a primary mirror 21, a secondary mirror 22, and a light baffle 23 to prevent radiant energy from being projected onto a reticle R except by reflection from primary and secondary mirrors 21 and 22. Reticle R is fixed to a gear 24 which is rotated by means of a pinion 25 driven by a motor 26. Gear 24 is annular in shape to extend around reticle R and to permit the passage of radiant energy therethrough to a cell sensitive to the radiant energy, not shown but incorporated by way of example in a Dewar flask 27 for cooling purposes. Electrical output leads from the cell are indicated at 28.

Figure 2:
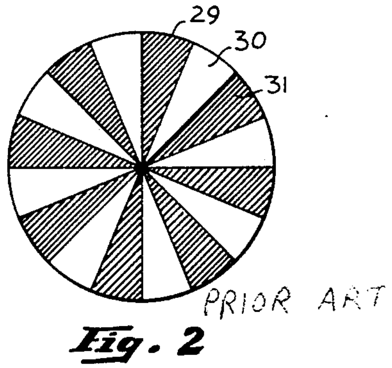
FIG. 2 is a front elevational view of a conventional reticle illustrating its spoked pattern.

A conventional spoke reticle 29 is shown in FIG. 2 having areas 30 relatively transparent to radiant energy and areas 31 relatively opaque to radiant energy. Although the designation is pure illustrative and the dark areas may be employed to represent areas transparent to radiant energy and light areas may be employed to represent areas opaque to radiant energy, all the reticles shown in FIGS. 2, 5 and 6 to 12 will be described in a manner such that the dark areas will represent areas which are relatively opaque to radiant energy and the light areas will represent areas relatively transparent to radiant energy.

It is to be noted that when areas on reticles are referred to herein as transparent and opaque, what is meant is that they are relatively transparent and opaque. It is to be understood that the chopping efficiency of a reticle will be dependent upon the relative opaque and transparent character of the respective areas on the reticle and that it is normally desirable to use material in a reticle to make one area as opaque as possible to radiant energy and one area as transparent as possible to radiant energy.

Figure 3:
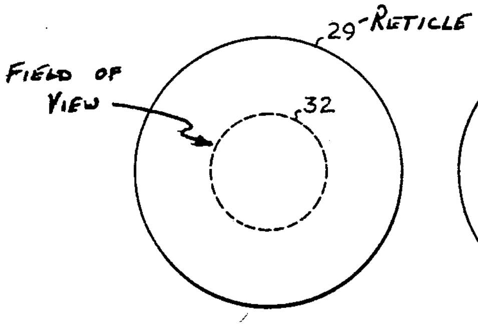
FIG. 3 is a front elevational view of a reticle having a dotted line indicating the position of a centered field of view thereon practiced in the prior art.

In the reticle 29 as shown in FIG. 3, an imaged field of view 32, which conventionally is circular in shape, is located exactly at the symmetrical center of reticle 29. In search, the whole collection apparatus 20 with or without reticle 29 may then be moved in any prescribed pattern in a scanning operation to determine the existence of a target in any predetermined surveillance volume scanned by the field of view of the collection apparatus 20.

Figure 4:
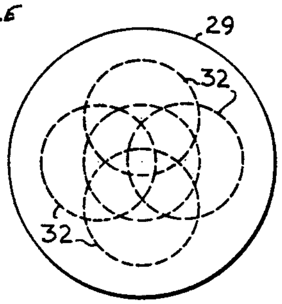
FIG. 4 is a front elevational view of a reticle having dotted lines illustrating the manner in which an imaged field of view is conventionally removed relative to the reticle to determine the angular position of a point target relative to the optical axis of radiant energy collection apparatus employed therewith.

It is also often necessary to determine accurately the position of a particular point target in the imaged field of view of collection apparatus 20 for tracking or other purposes. In this case, it is conventional to nutate the collection apparatus 20 on a gimbal system (not shown). Nutation describes the motion of collection apparatus 20 by moving the optical axis thereof over a surface describing a cone in space. In this case the imaged field of view 32 may be positioned as indicated in the several dotted circles in FIG. 4.

According to recent developments in the art, preferably an imaged field of view 33 is provided as indicated in FIG. 5 on reticle 29 in an off center or offset position. In search, the imaged field of view 33 may be maintained in this fixed angular position relative to absolute space while reticle 29 is rotated about its symmetrical axis **29*a*. In tracking, in the offset system, several different types of apparatus may be employed to change the direction in which the moving fan-shaped transparent and opaque areas 30 and 31 cross the field of view 33. In a preferred form of off center reticle tracking arrangement, the field of view 33 is held substantially fixed in space—that is, except for what relatively small motion may be required to actually track a moving target once it has been acquired within the field of view. Such a target is indicated as 34 in FIG. 5. Means (not shown) are then provided for periodically translating the axis 29*a* of the spinning reticle 29 in a planetary fashion around the periphery of the field of view 33. The path of this planetary translational motion is depicted by the dotted line circle 33*a*. This translation is accomplished at some predetermined angular speed so that the direction of spoke movement relative to some space reference line within the field of view, such as a horizontal line whose image is depicted by the dotted line 33*b*, is continuously changed and is different for each instant of time within the translational period. In other words, the direction of spoke movement relative to some reference line in space is different for each position of the reticle axis 29*a* as it is translated around circular path 33*a*. Thus, as illustrated in FIG. 5, when the axis 29*a* of the reticle 29 is positioned above the field of view as shown, and the reticle is spun about its axis in the direction of the arrow S, the edges of the reticle spokes which fall within the field of view will be moving in the general direction of arrow M. The arrow M in FIG. 5 depicts a spoke chopping motion which is substantially parallel to the space reference line 33*b*. On the other hand, asusming planetary translation of the reticle axis in the direction of the arrow P in FIG. 5, the reticle axis 29*a* will as some later instant in time be translated to the position 29*a*'** shown in FIG. 6*a*. Under these conditions the spoke motion within the field of view, depicted by arrow M in FIG. 6*a*, will be in a direction perpendicular to the space reference line **33*b*** and upwardly directed.

FIGURES 6*b* and 6*c* illustrate the direction of spoke motion at later instants in time within the planetary translational period of the reticle axis. Thus there is imposed, by the technique of translating the reticle axis about the imaged field of view, a relative motion between the imaged field of view and the symmetrical axis of the reticle. If then the target 34 is displaced from the optical axis of the field of view, the conventional frequency modulation of the cell output signal for tracking purposes will be realized. It is to be noted that the word "translated" is used in its technical analytic geometry sense and that point target 34 always remains in the top of imaged field of view 33 as the position of imaged field of view 33 is changed with respect to the orientation of the pattern of transparent and opaque areas 30 and 31 in imaged field of view 33.

Figure 7:
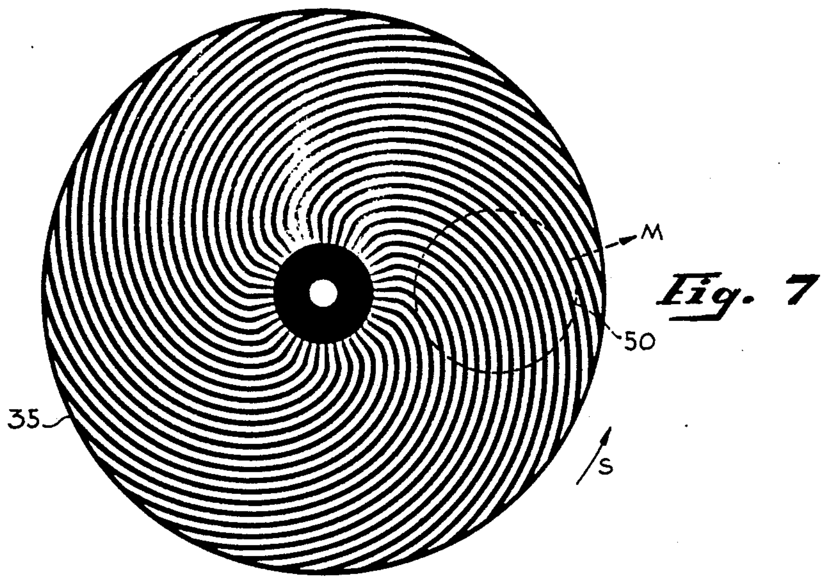

Reticles 35, 36, 37, 38, 39 and 40 shown in FIGS. 7 through 12 are made in accordance with the invention and may be employed in any of the systems described hereinbefore. However, reticle 35 shown in FIG. 7 is preferably used in the offset relationship illustrated in FIGS. 5 and 6.

Figure 8:
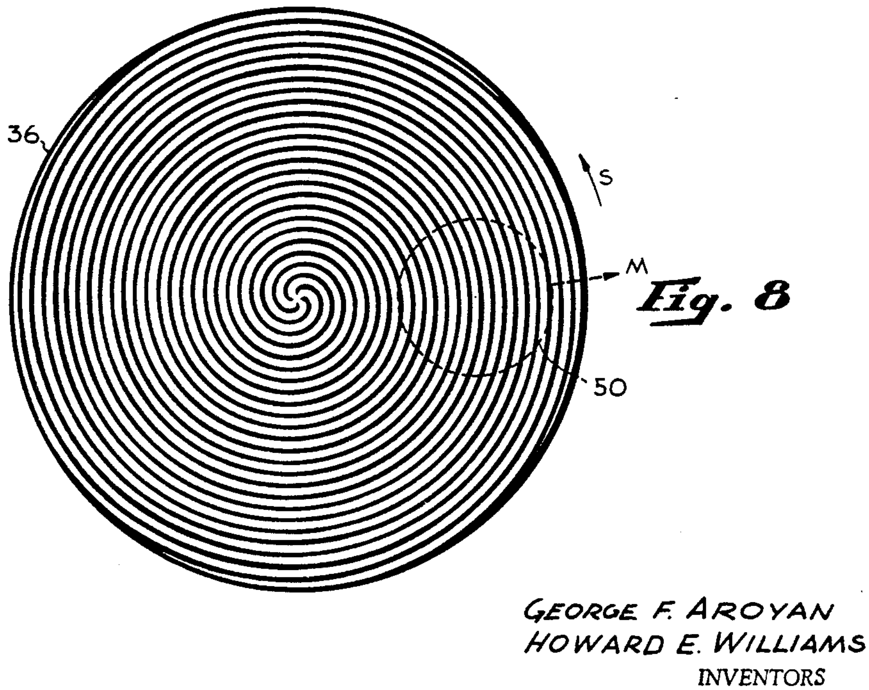

Reticle 36 which is shown in FIG. 8 may be employed in either the centered or offset positions. Reticles 37 and 38 shown in FIGS. 9 and 10, respectively, are preferably employed in the offset position illustrated in FIG. 5 but both of these must be used only in search. Reticles 39 and 40 shown in FIGS. 11 and 12, respectively, are preferably employed in the centered position illustrated in FIGS. 3 and 4.

It is to be noted that all the reticles 35, 36, 37, 38, and 39 incorporate involute-type patterns, although the opaque and transparent areas on reticle 40 are not defined between perfect involute curve. An involute by definition is a curve traced by any point of a perfectly flexible inextensible thread kept taut as it is wound upon or unwound from another curve. Thus, the relatively opaque and transparent areas of all reticles 35, 36, 37, 38 and 39 are defined between parallel involute curves. The relatively opaque and transparent areas of reticle 40 are defined between modified involute-type curves to have a greater radius of curvature at one angular position than at another on the reticle.

Figure 10:
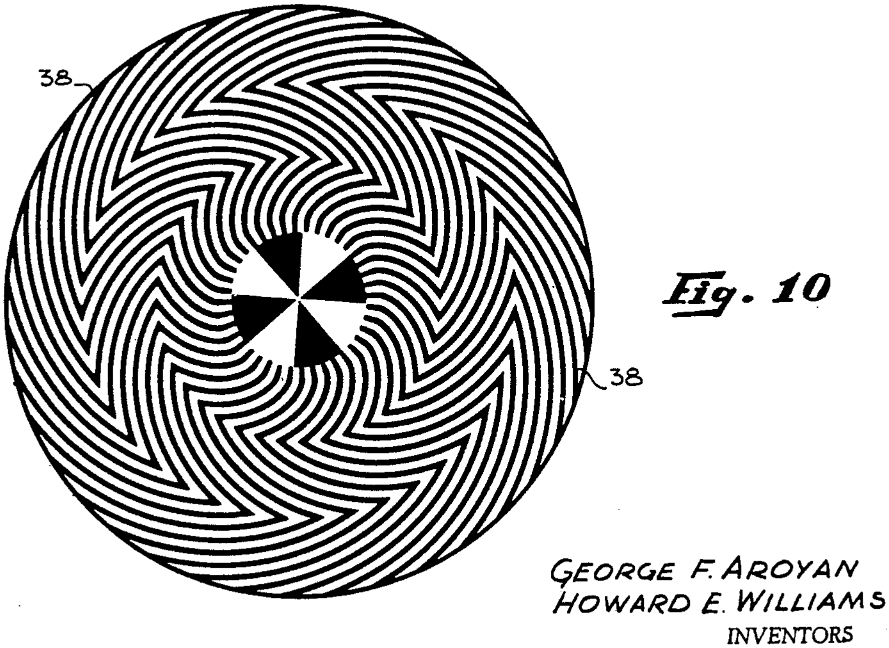

All the involute-type patterns shown in FIGS. 7 to 11 have been constructed from involutes of a circle and reticle 40 has been constructed from modified curves derived from an involute of a circle. However, an involute of any plane closed curved may be employed in the construction of reticles of the invention. A "single cycle involute" reticle pattern is defined for use hereinafter as one having only two mutually exclusive areas, one being opaque to radiant energy and the other being transparent to radiant energy. According to this definition, reticle 35 shown in FIG. 7 is a 40 cycle involute; whereas reticle 36 shown in FIG. 8 is a 4 cycle involute. All reticles 37, 38 and 39 shown in FIGS. 9, 10 and 11, respectively, are 40 cycle involutes. The reticle 40 shown in FIG. 12 is a 9 cycle involute. It is to be noted that all transparent and opaque areas on any one reticle should be substantially equal throughout although they may not appear exactly so in the drawings.

What is most important to note is that widths of all the relatively opaque and transparent areas on all reticles shown in FIGS. 7 through 12 are substantially equal throughout their lengths. The widths of opaquea nd transparent areas on reticles shown in FIGS. 7 through 12 are chosen to be substantially equal to the diameter of the blur circle produced by the radiant energy collection apparatus with which they are employed. Due to the fact that opaque and transparent areas are equal in width, near ideal space filtering is provided by these reticles of the invention. They are unusually selective and discriminate against targets having sizes larger and smaller than the size of the blur circle. The number of involute cycles of a reticle times its angular velocity will determine the fundamental chopping frequency thereof.

If an imaged field of view is offset from the center of reticles 35 and 36 of FIGS. 7 and 8, respectively, as indicated at 50, it is to be noted that nearly straight and parallel transparent and opaque areas intercept the imaged field of view. When the reticle is spun in the direction of the arrow S, an effective spoke chopping movement in the direction of arrow M is produced.

Figure 9:
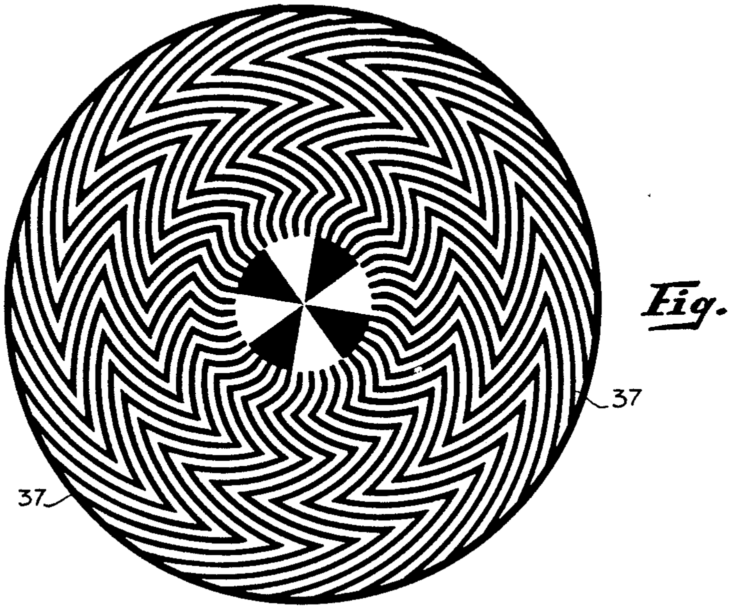

Due to the fact that the involute pattern of the invention may have very little curvature and approaches a space filtering reticle with exactly parallel opaque and transparent areas, background lines may be sufficiently curved to be modulated exactly in the same manner as a point target when the offset position illustrated in FIG. 5 is employed with either one of the reticles 35 or 36, of the invention. To prevent this from happening, a V-shaped or zifi-zag pattern is provided in accordance with one form of the invention. It is an outstanding feature of the invention that the zig-zag pattern may be produced by employing an involute-type pattern, for example, with a forty cycle involute pattern as shown in FIGS. 9 and 10. The involute patterns of reticles 37 and 38 shown in FIGS. 9 and 10, respectively, have their directions of curvature abruptly reversed at successive radii of the centers of corresponding reticles. Of course only one reversal within a given field of view is necessary to provide this feature of the invention although four reversals are shown in reticle 37 of FIG. 9 and two are shown in reticle 38 of FIG. 10. However, it is desirable to limit the reversals to as few as possible consistent with a desired degree of line discrimination in order to improve space filtering.

It is conventional to make a semi-circular area on a spoke-type reticle such as reticle 29 shown in FIG. 2 gray. That is, it sometimes is desirable to make a semi-circular area thereon of a radiant energy transmitting character intermediate the transparent character of areas 30 and the opaque character of areas 31. Such is reticle 39 shown in FIG. 11 which has a semi-circular portion 41 of a transparency intermediate those of transparent areas 42 and opaque areas 43. It is thus to be noted that an involute pattern such as shown on reticle 39 of FIG. 11 may be combined with structural modifications of conventional reticles. Reticle 39 of FIG. 11 is preferably employed at the output of a radiant energy system to produce amplitude modulation whose phase is indicative of the position of a point target in the field of view relative to the reticle for tracking.

It is also conventional to use a spoke-type reticle to produce frequency modulation of the output signal of a radiant energy sensitive cell for the accurate determination of the position of a point target during tracking without nutation. The reticle 40 shown in FIG. 12 is a reticle which provides such frequency modulation. It is to be noted that in FIG. 12 opaque areas 44 have a smaller circumferential dimension than opaque areas 45, i.e., the arcuate distances on the outer circumference of reticle 40 where these areas intercept the outer circumference of reticle 40 are different. Lines 46, 51, 52 and 53 shown in FIG. 12 on reticle 40 are simply construction lines.

A conventional spoked reticle may have alternate areas between pairs of lines 46 relatively opaque and transparent to radiant energy to produce frequency modulation. The manner in which reticle 40 may be constructed is as follows. Construction lines 46 may be drawn as is done in the conventional spoke-type reticles. Construction lines 51, 52 and 53 which comprise concentric circles spaced equal distances apart may also be drawn. Only three construction circles 51, 52 and 53 are illustrated for the sake of clarity although spaced concentric circles should be drawn all the way out to the circumferential edge of reticle 40. After this has been done, smooth equally spaced curves starting with the intersection of circle 51 with each of the construction lines 46 should be drawn through these points of intersection with immediately succeeding larger concentric circles with succeeding construction lines spaced angularly to the right. Thus, the intersection of circle 51 with one construction line 46 and with the intersection of an immediately adjacent construction line 46 on the right side of the first with concentric circle 52 will be the first two points on the same curve. Once curves are drawn through all of these points of intersection, the opaque and transparent areas will be defined between these curves. All the curves of course should be substantially parallel, whereby they may be maintained equal distances apart throughout their lengths for good space filtering. According to the method of construction just described, it can be seen that reticle 40 does not have relatively opaque and transparent areas defined by perfect involutes of a plane closed curve.

It is an outstanding feature of the invention that frequency modulation may be produced with a reticle 40 without space filtering degradation. It is to be noted that in a conventional type spoked reticle incorporating alternate relatively opaque and transparent areas between alternate adjacent pairs of lines 46, the circumferential distance between one line 46 and an adjacent one across a transparent area will vary from one transparent area to the next even at the same radius. This means that the spacing between adjacent lines 46 defining a transparent area may not only be equal to the diameter of the circle of a point target only at one particular radius, but also that the size of the blur circle may not match with any other transparent area even at the same radius. However, in accordance with the invention, the reticle 40 provides substantially equal width transparent areas throughout their lengths and frequency modulation is still produced. Thus it is possible not only to produce frequency modulation with reticle patterns made in accordance with the invention, but, for the first time, it is possible to produce frequency modulation without degrading space filtering.

The operation of reticles made in accordance with the the invention as unusually good space filters has been explained in connection with an analogy to images of different sizes located at different radii on a conventional spoked reticle as compared to targets chopped by a transparent area or reticle aperture having a constant width throughout its length. As stated previously, noise sources, which are defined as radiant energy sources having a size different from the size of the blur circle produced by a particular radiant energy collection apparatus, may cause an output signal of an associated radiant energy sensitive cell to be of the same frequency as that of the chopping effect of a point target. This means that an electrical filter cannot be employed to select the time frequency signal produced by the radiant energy sensitive cell from that produced by a noise source. However, an explanation of the selective or space filtering character of reticles made in accordance with the invention over conventional spoked reticles may be made in a manner similar to the explanation of the selection of an alternating current signal from noise of different time frequencies in a predetermined band. For example, as an electrical filter is capable of discriminating against noise if the pass band of the electrical filter is narrowed, if the space frequency band of a space filter such as a reticle is narrowed, this filter also becomes more selective.

As outlined previously, the term "space frequency" is employed to denote a function of inverse space in the same manner as time frequency is employed to denote inverse time. Perhaps a better understanding of the mathematics of this concept may be obtained from the following articles:

"L'Integral de Fourier et ses Applications a l'Optique," by P. M. Duffieux, published in 1946 by Besancon, Faculte des Sciences;

"Optics and Communication Theory," by P. Elias, published in 1953 by the Journal Optical Society of America;

"On the Assessment of Optical Images," by E. H. Linfoot and P. B. Felgett, published by the Royal Society London Philosophical Transaction No. 931,247, in February 1955; and "Selected Topic in Optics and Communication Theory," by E. L. O'Neil, published by the Boston University Physical Research Labs in 1956.

The above listed articles disclose a very useful method of analysis of the space filtering effect of reticles through the application of the Fourier transform. In FIG. 13, the Fourier transform, called a "space transform," of a relatively small sized object or target is indicated at 60 and the space transform of a noise source effectively representing an object larger than the target is indicated at 61. The transforms are plotted with the ordinate representing power amplitude and the abscissa representing space frequency, i.e., variations in intensity per unit of angular displacement of disc-shaped reticle as its apertures scan the field of view. The function actually "transformed" may be the portion of a transparent area intercepting a target as a function of reticle angular position.

It can be shown that the action of an infinite number of transmissive apertures of uniform width and spacing (such as would be defined by alternate opaque areas of an ideal reticle), continuously scanning a relatively large field of view, results in the effective reinforcement of but a single space frequency and its harmonics. In the arrangement of FIG. 1 where an energy sensitive cell measures the energy passed by the reticle as its transmissive areas pass over the field of view, the reinforced space frequency is evidenced by amplitude variations in the direct current output of the energy sensitive cell. These amplitude variations will always be at a predetermined electrical time frequency which in the case of a disc-type reticle is of a value determined by first, the angular speed of the reticle as it is spun about its axis, and second, the number of spokes borne by the reticle. This time frequency is called the chopping frequency of the spinning reticle so that there will be developed at the output of the energy sensitive cell a direct current component plus a signal carrier at the chopping frequency. The amplitude of this carrier will depict the amount of energy within the total field of view which is represented at the particular space frequency (and its harmonics) which the reticle aperture, or spoke spacing, reinforces. Thus, referring to FIG. 13, if the spacing of the opaque areas of the reticle is such to define reticle apertures reinforcing the fundamental space frequency $f_1$, it will be seen that the amplitude of the carrier delivered by the energy sensitive cell will be mainly representative of the undesired noise source whose energy distribution is depicted by curve 61. Under such conditions it is extremely difficult to detect the presence of the target whose space frequency description is defined by the curve 60.

On the other hand if the reticle apertures are made smaller, the fundamental space frequency which the reticle reinforces may be raised to a higher value such as $f_2$ in FIG. 13. Under these conditions the amplitude of the electrical carrier appearing at the output of the energy sensitive cell will depict the amount of energy within the total field of view which is represented at the space frequency $f_2$ (and, of course, its harmonics). It will now be seen that the amplitude of the carrier delivered by the energy sensitive cell will be mainly representative of the target whose space frequency description is depicted by the curve 60 while the contribution of the noise source depicted by curve 61 will be relatively small. Therefore, by measuring the amplitude of the carrier appearing at the output of the energy sensitive cell, the presence or absence of a target may be more easily detected.

From the foregoing, the advantage of the reticle provided by the present invention clearly appears. Consider, for example, the prior art radial disc-type spoked reticle illustrated in FIG. 2. Here the reticle aperture 30 varies in width by a considerable amount as a function of radius from the axis of the reticle at which it is examined. Such a reticle, therefore acts to reinforce a band of space frequencies, by way of example, extending from $f_1$ to $f_2$ in FIG. 13. The amplitude of the carrier appearing in the output of the energy sensitive cell will therefore depict the amount of energy falling within the total field of view which is embraced by a band of space frequencies extending from $f_1$ to $f_2$ which clearly results in the degradation of the over-all signal to noise characteristics of the system. The space frequency selectivity characteristic of the prior art reticle shown in FIG.

2 is therefore seen to be substantially poorer than an ideal reticle.

Since, in accordance with the present invention, the reticle apertures active within the field of view, because of the particular involute-type construction by which they are defined, are substantially uniform in width, a reticle constructed in accordance with the present invention will reinforce substantially only one space frequency. Thus an involute-type reticle made in accordance with the present invention having a reticle aperture or spoke spacing of a width which reinforces the space frequency $f_2$ in FIG. 13 will, for reasons above described, greatly enhance the signal to noise ratio of the detection system and render it substantially more effective in discriminating between spurious gradients in background radiation and targets of predetermined size superimposed upon this background.

Thus it is seen that substantial improvement in space filtering may be made by using equal width opaque and transparent areas of the invention, incorporating both radially and circumferentially extending areas transparent and opaque to radiant energy. Still further, discrimination may also be made against long background lines by means of reticles 37 and 38 shown in FIGS. 9 and 10. Amplitude modulation may be produced by the use of reticle 39 shown in FIG. 11. Frequency modulation without degraded space filtering may also be produced by the use of reticle 40 shown in FIG. 12.

What is claimed is:

1. A reticle comprising a body having a transverse cross-sectional construction presenting at least a curving areas relatively opaque and transparent to radiant energy, area relatively transparent to radiant energy between arcuate turns thereof, both of said areas being mutually exclusive, having uniform equal widths throughout their lengths and extending both radially and circumferentially from a central area of inception, all of said areas having at least one reversal in their direction of curvature at a predetermined radius from said area of inception.

2. A reticle comprising a body having a transverse cross-sectional construction presenting alternate adjacent areas relatively opaque and transparent to ardiant energy, said areas being defined between segments of the involutes derived from a circle, all of said areas having at least one reversal in their direction of curvature along segments of said involutes derived from said circle in a reverse direction at a predetermined radius from the center of said circle.

3. A reticle comprising a disc-shaped body having a transverse cross-sectional construction presenting zig-zag shaped areas having uniform equal widths throughout their lengths thereon alternately opaque and transparent to radiant energy, said areas extending generally both radially and circumferentially from the center of said body along involutes of a plane closed curve with the apexes of the zig-zag areas pointing alternately in opposite circumferential directions.

4. A reticle comprising a disc-shaped body having a transverse cross-sectional construction presenting alternate adjacent areas relatively opaque and transparent to radiant energy, said areas being defined between involutes of a plane closed curve on one half of said body, the other half of said body having a transparency to radiant energy intermediate that of said transparent and opaque areas, said areas defined by said involutes having uniform equal widths throughout their lengths.

5. In a system for detecting a predetermined type of energy in at least a portion of the electromagnetic energy spectrum, the combination comprising: apparatus having a field of view for collecting energy of said predetermined type within said field of view and focusing an image of said field of view at a predetermined image plane, said energy collection apparatus being constructed to focus radiation of said predetermined type of energy from any source in said field of view to a transverse dimension at said image plane no less than a predetermined blur circle diameter; and a reticle including an approximately disc-shaped body positioned to rotate about an axis approximately perpendicular to said image plane at the position thereof to intercept said imaged field of view, the transverse cross-sectional area of at least one material of said reticle being relatively opaque to said collected energy, said relatively opaque area curving to define an area relatively transparent to said collected energy between arcuate turns of said relatively opaque area, both of said areas having uniform equal widths throughout their lengths, said widths being substantially equal to said blur circle diameter, both of said areas also extending both radially and circumferentially from a center area of inception.

6. In a system for detecting a predetermined type of energy in at least a portion of the electromagnetic energy spectrum, the combination comprising; apparatus having a field of view for collecting energy of said predetermined type within said field of view and focusing an image of said field of view at a predetermined image plane, said energy collection apparatus being constructed to focus radiation of said predetermined type of energy from any source in said field of view in a manner to have a transverse dimension at said image plane no less than a predetermined blur circle diameter; and an approximately disc-shaped reticle rotatable about an axis approximately perpendicular to said image plane at the position thereof to intercept energy focused at said image plane and having a transverse cross-sectional construction presenting at least one area relatively opaque to said collected energy to define one area relatively transparent to said collected energy adjacent said relatively opaque area, both of said areas being defined between involute curves and having uniform equal widths throughout their lengths, said widths being substantially equal to said blur circle diameter.

7. In a system for detecting a predetermined type of energy in at least a portion of the electromagnetic energy spectrum, the combination comprising: apparatus having a field of view for collecting energy of said predetermined type within said field of view and focusing an image of said field of view at a predetermined image plane, said energy collection apparatus being constructed to focus radiation of said predetermined type of energy from any source in said field of view in a manner to have a transverse dimension at said image plane no less than a predetermined blur circle diameter; and a reticle rotatably mounted about an axis substantially perpendicular to said image plane and positioned to intercept energy focused thereat, said reticle having a transverse cross-sectional construction presenting alternate adjacent areas relatively opaque and transparent to said collected energy, said cross-sectional areas having uniform equal widths throughout their lengths and being defined between involutes of a plane closed curve, said widths being substantially equal to said blur circle diameter.

8. A reticle for use in a radiant energy detection system in which a field of view is imaged on a focal plane wherein the reticle is rotatably positioned for modulating the imaged radiant energy comprising a disc having alternate opaque and transparent sectors, the boundaries of which are defined by the involutes of a plane closed curve, each of said sectors being of uniform equal widths throughout its length.

9. A reticle for use in a radiant energy detection system in which a field of view is imaged on the reticle in a focal plane and in which continuous relative movement is provided between the imaged field of view and the reticle, said reticle comprising a disc having alternate opaque and transparent sectors defined by a plurality of separate involute curves originating from a plane closed curve centrally disposed with respect to said disc, each of said sectors having an equal width along a radial dimension on the disc corresponding to a predetermined size of an object within said field of view whereby the reticle operates to discriminate radiant energy emissive objects appearing in said field of view of said predetermined size irrespective of the position of the object within the field of view.

10. A reticle in accordance with claim 9 in which the sectors of the reticle extend both radially and circumferentially from the plane closed curve with each of the sectors having at least one reversal in their direction of curvature at a predetermined radius whereby the effect of background lines appearing in the field of view is substantially diminished.

11. A reticle in accordance with claim 9 in which the involutes defining the sectors of the disc are modified to have a greater radius of curvature at one angular position than at another whereby the reticle is capable of effecting a frequency modulation of the radiant energy appearing in the imaged field of view.

References Cited in the file of this patent

UNITED STATES PATENTS

| | | |
|---|---|---|
| 165,123 | Robertson | June 29, 1875 |
| 233,084 | Erwin et al. | Oct. 12, 1880 |
| 2,403,066 | Evans | July 2, 1946 |
| 2,403,983 | Koenig | July 16, 1946 |
| 2,562,181 | Frommer | July 31, 1951 |
| 2,648,779 | Kohl | Aug. 11, 1953 |
| 2,713,134 | Eckweiler | July 12, 1955 |
| 2,844,990 | Nagler et al. | July 29, 1958 |
| 2,931,912 | Macleish | Apr. 5, 1960 |
| 2,981,842 | Kaufold et al. | Apr. 25, 1961 |
| 2,996,945 | Davis | Aug. 22, 1961 |

FOREIGN PATENTS

| | | |
|---|---|---|
| 263,814 | Italy | Mar. 30, 1929 |
| 781,280 | Great Britain | Aug. 14, 1957 |